United States Patent [19]  [11] Patent Number: 4,982,619
Thoreson                     [45] Date of Patent:   Jan. 8, 1991

[54] GEAR SHIFT MECHANISM FOR TILT CAB VEHICLES

[75] Inventor: Torsten Thoreson, Kungälv, Sweden

[73] Assignee: AB Volvo, Goteborg, Sweden

[21] Appl. No.: 349,422

[22] Filed: May 8, 1989

[30] Foreign Application Priority Data

May 9, 1988 [SE] Sweden .................... 8801751

[51] Int. Cl.⁵ .............. B60K 20/04; B60K 26/00; B62D 33/067
[52] U.S. Cl. .................... 74/473 R; 74/473 P; 180/89.14; 180/328
[58] Field of Search ............ 74/473 R, 473 P; 180/89.14, 328

[56] References Cited

U.S. PATENT DOCUMENTS

| 3,757,599 | 9/1973 | Albrecht | 74/473 R |
| 4,206,826 | 6/1980 | McMillen et al. | 74/473 R |
| 4,220,217 | 9/1980 | Kobayashi | 74/473 R |
| 4,235,299 | 11/1980 | Reynolds | 74/473 R |
| 4,269,282 | 5/1981 | Meacock, II et al. | 74/473 R |

FOREIGN PATENT DOCUMENTS

| 2110310 | 9/1972 | Fed. Rep. of Germany | 180/328 |
| 2328230 | 12/1974 | Fed. Rep. of Germany . | |
| 0196363 | 11/1983 | Japan | 74/473 R |
| 439464 | 6/1985 | Sweden . | |

Primary Examiner—Rodney H. Bonck
Assistant Examiner—Winnie Yip
Attorney, Agent, or Firm—Burns, Doane, Swecker & Mathis

[57] ABSTRACT

A gear shift mechanism for tilt cab trucks comprises a lever-receiving structure disposed on the engine/transmission structure. The lever-receiving structure includes a ball joint. The shift lever is removably received in a socket of the ball. When the cab is tilted, the lever becomes detached from the ball joint and is centered in its through-hole in the cab floor or engine hood by bands or wires and tensile springs, which are fixed or tensioned between the lever and the edges of the through-hole.

8 Claims, 1 Drawing Sheet

GEAR SHIFT MECHANISM FOR TILT CAB VEHICLES

BACKGROUND OF THE INVENTION

The present invention relates to a gear shift mechanism in a motor vehicle with a cab tiltable relative to the vehicle chassis and engine/transmission, comprising a lever receiving mounting arranged under the cab floor of the engine hood with a bearing for a gear shift lever, which extends into the cab through a through-hole in the floor or engine hood.

In trucks with front mounted tiltable cabs, in which the engine is usually mounted under the cab and is covered by a hood between the seats, the gear shift lever and associated linkages must be arranged so that they do not present an obstacle to the tilting movement. The arrangement should be such that the gear selector has distinct positions and it should only be minimally affected by the movements of the cab, which can, in todays modern trucks with comfortable spring mounted cabs, be relatively large in all directions relative to the chassis and engine/transmission. Furthermore, the gear selector mechanism should be sealed off effectively so that a low noise level can be maintained in the cab. Finally, the gear shift mechanism should be simple and reliable and permit tilting of the cab without any additional "releasing operations".

None of the solutions presented up to now fulfill all of these conditions. While it is true that gear selector mechanisms with the lever mounting fixed to the transmission usually have distinct positions and are only minimally effected by cab movements, they have either sealing problems (in unarticulated lever designs) because the hole in the engine hood or floor must be large or they require extra blocking mechanisms for the release means (for articulated lever designs) Swedish Patent No. 439,464.

Gear shift mechanisms with the shift lever bearing joined to the cab are simpler to seal in order to keep the noise level low, but in this case the shift lever must be able to somehow be released from the rest of the shift mechanism when the cab is tilted. These mechanisms are, however, affected by cab movements with indistinct gear speed positions as a result as well as problems with the gear selector being jolted out of gear when driving on uneven surfaces.

Gear shift mechanisms, in which the shift lever bearing is resiliently joined to the cab, are shown in German Patent No. 2,110,310 and U.S. Pat. No. 4,269,282, for example. In both of these mechanisms, the shift lever has a spherical end portion which is normally received in an opening in the gear transfer mechanism. This end portion is removed from this opening when the cab is tilted. The spring loaded mounting of the bearing in the cab permits limited shock absorbing movement of the cab without any problems, but large vertical cab movements or lateral movements present the risk that the spring loaded shift lever mounting housing will lose contact with its stationary support surface in the gear lever socket in the engine/transmission, resulting in play, misalignment and malfunctioning. Hard and rapid gear shifting can have the same result. Another disadvantage is that it is not possible to provide a connection free from play between the lever and the gear transfer mechanism. In order to permit disengagement and engagement, there must be a certain amount of play between the spherical end of the lever and the complementary socket in the gear transfer mechanism. This play increases with time due to wear and produces an even larger effect at the shift lever handle which produces indistinct gear selection.

The purpose of the present invention is to remove all of the above mentioned disadvantages and provide a shift mechanism of the type described by way of introduction, which is simple and reliable, has distinct gear positions, is simple to seal off to provide low noise level inside the cab, and which does not require any additional release steps prior to tilting the cab or any engaging steps after tilting the cab back to its operating position.

SUMMARY OF THE PREFERRED EMBODIMENT

This is achieved according to the invention by virtue of the fact that the lever receiving mounting with associated bearing is securely mounted in the engine/transmission, that the lever is removably connected to the bearing to become detached from the bearing when there is a lever movement caused by the tilting movement of the cab, and that the lever is connected with limited mobility to the cab and, in the tilting position of the cab, is spring loaded to a defined disposition in the through-hole in the floor or engine hood.

The direct connection between the shift lever and a bearing securely joined to the engine/transmission provides distinct shift positions and negligible risk of the gear selector being jolted out of gear, since the shift mechanism is not affected by the cab movements. By placing the lever connection directly in the bearing, the lever will always be in the through-hole in the floor or engine hood regardless of the position of the cab, thus eliminating the need for separating sealing surfaces. An undivided sealing means can be used between the lever and the edges of the through-hole, thus making effective noise insulation possible.

The mechanism also permits comparatively large relative movements in all directions between the cab and the engine/transmission. The cab can be tilted up or down regardless of the gear selector position.

BRIEF DESCRIPTION OF THE DRAWING

The invention will be described in more detail with reference to an example shown in the accompanying drawing, where.

DETAILED DESCRIPTION OF A PREFERRED EMBODIMENT OF THE INVENTION

Figure 1:
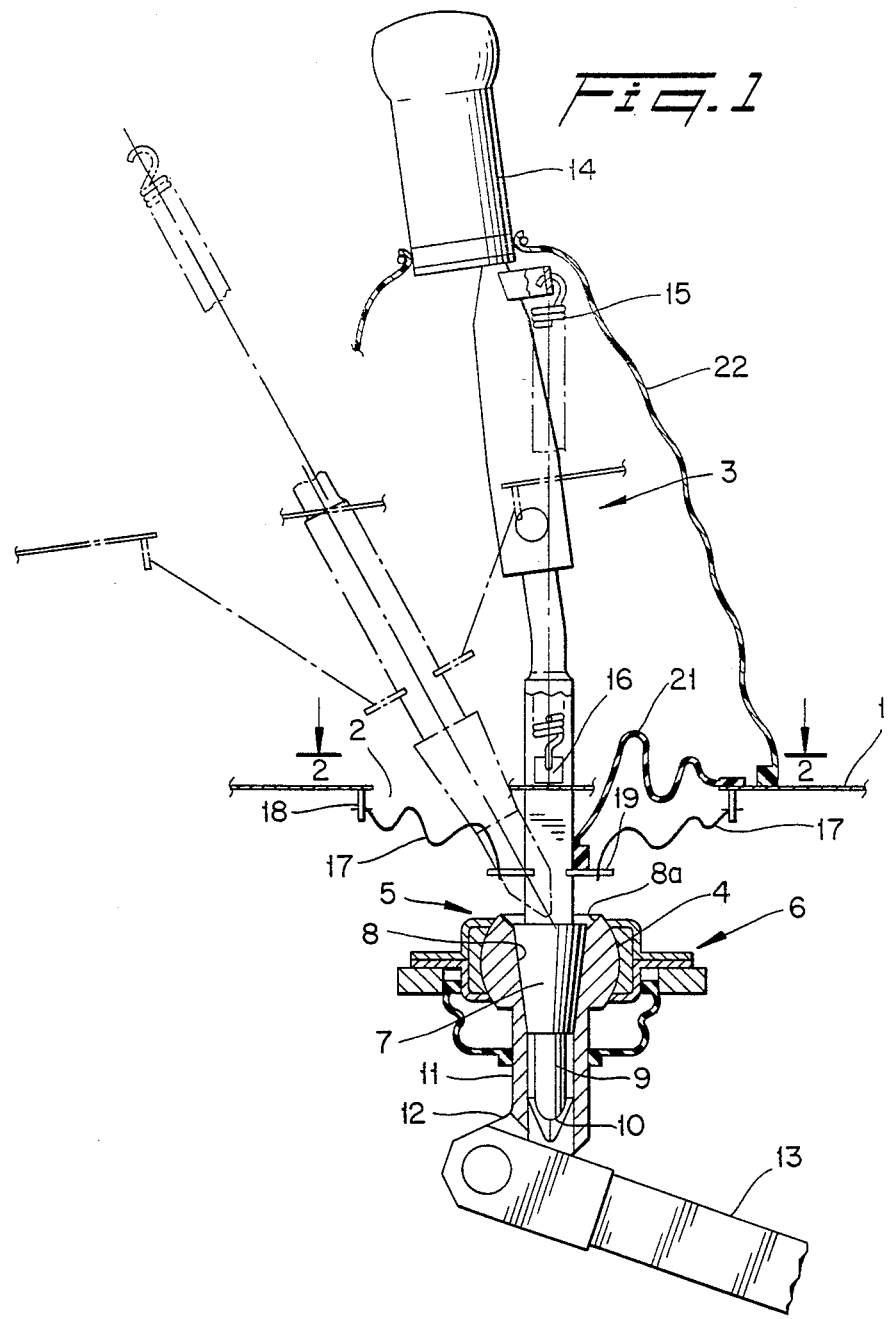
FIG. 1 shows a partially sectioned schematic side view of the gear shift mechanism according to the invention.
Figure 2:
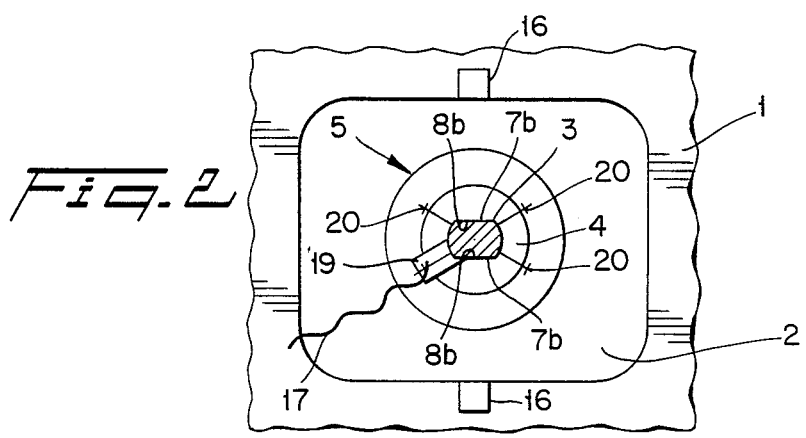
FIG. 2 shows a view along the line II—II in FIG. 1.

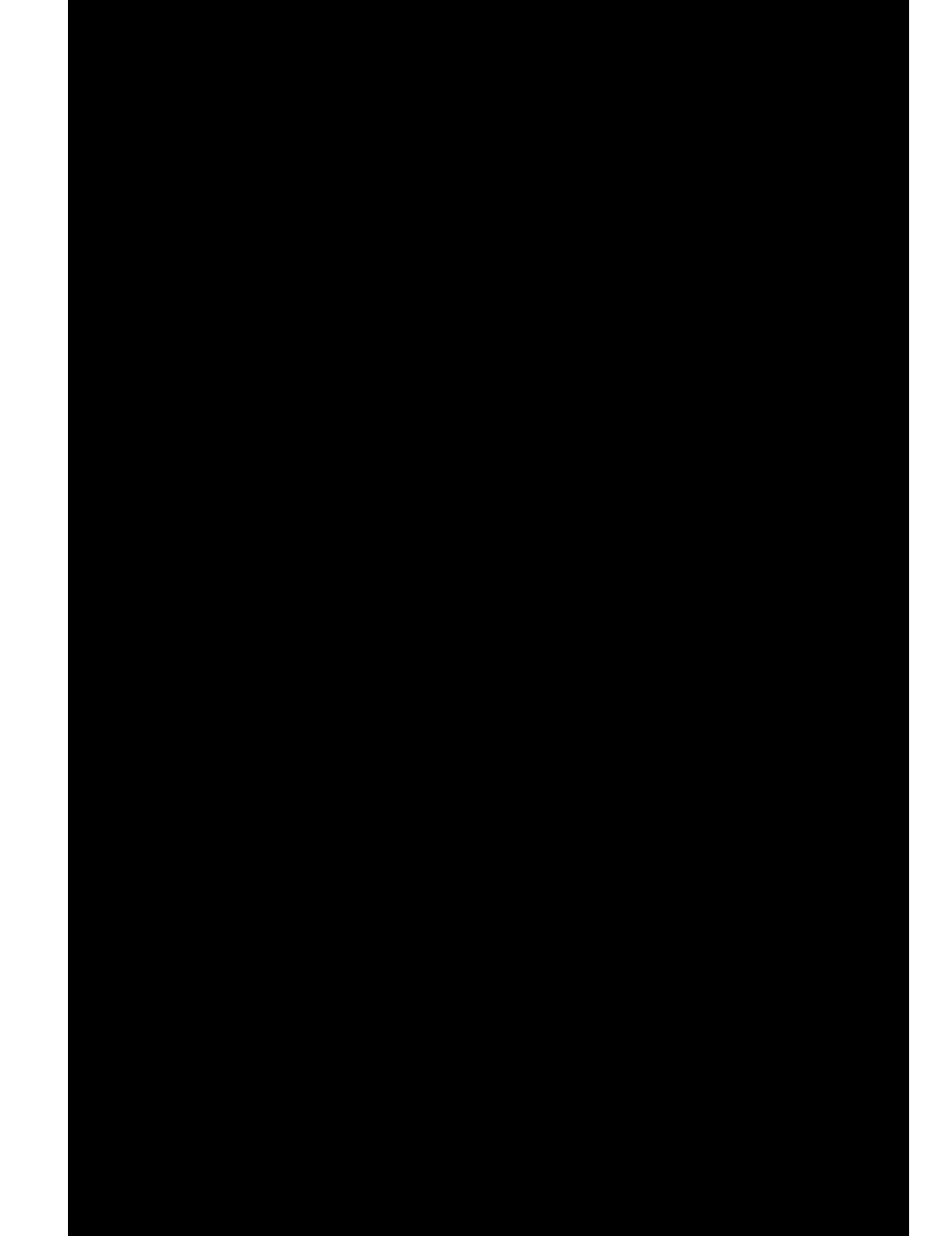

In the Figures, 1 designates a plate constituting a wall of a part of a floor or an engine hood in a truck cab and 2 is an opening forming a through-hole for a shift lever generally designated 3, which, in a manner to be described in more detail below, is connected to a ball 4 of a ball joint 5 in a lever receiving mounting 6. The cab is tiltable relative to a body of the vehicle, the vehicle including a chassis and an engine/transmission structure mounted on the chassis. The mounting 6 is fixed to the vehicle engine, the transmission or some component joined thereto (not shown), so that there is no relative movement between the shift lever 3 and the transmission when there is relative movement between the plate